3,192,223
PREPARATION OF 1-METHYL-2-PYRIDINIUM-ALDOXIME CHLORIDE

Sylvan E. Forman, Lawrence Township, Mercer County, N.J., assignor to FMC Corporation, New York, N.Y., a corporation of Delaware
No Drawing. Filed Dec. 7, 1962, Ser. No. 242,912
4 Claims. (Cl. 260—296)

This application relates to an improved method for the preparation of 1-methyl-2-pyridiniumaldoxime chloride by the reaction of 2-pyridinealdoxime with methyl chloride.

1-methyl-2-pyridiniumaldoxime chloride is a known compound which is useful as an antidote for certain nerve gases. It is known that 1-methyl-2-pyridiniumaldoxime chloride may be prepared by the reaction of 2-pyridinealdoxime with methyl chloride. A recent article by R. I. Ellin, D. Easterday and A. A. Kondritzer in the Journal of Medical and Pharmaceutical Chemistry, volume 5, pages 404–405 (1962), teaches an improved synthesis of 1-methyl-2-pyridiniumaldoxime chloride by the reaction of 2-pyridinealdoxime with a large excess of methyl chloride in the presence of a large amount of N,N-dimethylformamide as a solvent. The reaction required 6 moles of methyl chloride for each mole of 2-pyridinealdoxime and 10 milliliters of dimethylformamide for each gram of 2-pyridinealdoxime. Other solvents such as ethanol, acetone, benzene, tetrahydrofuran and a petroleum fraction were tried but they did not give a pure product in good yield.

It is an object of this invention to provide a process for the production of 1-methyl-2-pyridiniumaldoxime chloride by the reaction of 2-pyridinealdoxime with methyl chloride which avoids the necessity of large excesses of methyl chloride and large amounts of an expensive solvent.

This and other objects will become apparent from the following description of this invention.

I have now discovered an improved process for preparing 1-methyl-2-pyridiniumaldoxime chloride in good yield by the reaction of 2-pyridinealdoxime with methyl chloride which avoids the disadvantages of the process described above. My process comprises reacting 2-pyridiniumaldoxime with methyl chloride in the presence of methanol as solvent. By the improved process of this invention good yields of 1-methyl-2-pyridiniumaldoxime can be prepared using a smaller amount of methyl chloride than was heretofore necessary. Moreover, methanol is a much cheaper solvent than dimethylformamide, can be used in smaller quantities, and is more readily recovered from the reaction system by vaporization. It is quite surprising that methanol gives these favorable results in view of the fact that prior investigators found that ethanol does not give a good yield. When dimethylformamide, the best solvent known to the prior art, is used in small quantities with the smaller quantities of methyl chloride allowable when operating in accordance with this invention, substantially no product can be isolated.

The starting materials of this invention are both commercially available products. At least 1 mole of methyl chloride is required for each mole of 2-pyridinealdoxime. For best results it is preferred that a slight excess of methyl chloride be present. No special advantages result from the use of more than about 3 moles of methyl chloride per mole of 2-pyridinealdoxime.

The reaction may be carried out at temperatures from about 70° C. to about 140° C. Preferably, the reaction is carried out at 80–90° C. At temperatures below about 70° C. the reaction is too slow, while at temperatures above about 140° C., decomposition of the product is excessive. Preferably, the reaction is carried out at the autogeneous pressure of the system at the particular temperature used, although higher or lower pressures may be used if desired.

The time required for completion of the reaction will depend upon the temperature employed. For example, at 80° C. about 22 hours will be required, while at 100° C. 4 hours are sufficient and at 120° C. 2 hours are sufficient.

The amount of methanol which is used as solvent is not critical. However, when methanol is used as the solvent, substantially lower amounts are necessary to achieve good yields as compared with solvents of the prior art. A suitable range of methanol is about 0.3–2 parts by weight of methanol per part of oxime. Of course, lesser amounts of methanol can be employed with diminished results. Although more than 2 parts by weight of methanol per part of oxime may be employed if desired, no special advantage results from the use of these amounts and the volume productivity of the system is reduced thereby.

Any suitable reactor may be used for this reaction. Preferably, the reaction is carried out in a closed glass reactor or a special corrosion resistant metal reactor. The use of ordinary metals such as iron and many stainless steels should be avoided, if possible, since these metals contaminate the product.

The following examples, illustrating the novel process of this invention, are presented without any intention that the invention be limited thereto. All parts and percentages are by weight.

Example 1

A glass tube was charged with 24.4 g. (0.2 mole) of 2-pyridinealdoxime, 30 ml. of methanol and 20.2 g. (0.4 mole) of methyl chloride. The tube was sealed, heated slowly to 90° C. in a rocking furnace, and held at that temperature for 22 hrs. The reaction mixture was allowed to cool, the seal was broken, and excess methyl chloride was allowed to distill off. A substantial quantity of crystals were visible. Evaporation of the methanol in vacuum left 34.3 g. of residual solids. The residue was dissolved in 5 times its weight of water. The pH of the solution was raised from 2.1 to 3.85 by addition of 44 ml. of approximately 1 N ammonium hydroxide. Extraction of the solution with ethyl ether resulted in the recovery of 1.6 g. (0.013 mole) of unreacted 2-pyridinealdoxime. The aqueous solution was concentrated by distillation of water at about 20 mm. pressure with gentle heat until crystallization occurred. The crystals were filtered off and washed with cold ethanol. Further evaporation of the filtrates resulted in additional quantities of crystals, until a total of 25.5 g. (0.148 mole) of 1-methyl-2-pyridiniumaldoxime chloride, M.P. 235–6.5°, was obtained, equivalent to a yield of 79% of theory when the recovered 2-pyridinealdoxime is taken into account. The pure product had the correct elemental analysis for carbon, hydrogen, nitrogen and chloride ion. The ultravioletspectrum in acid or alkaline solution and the infrared spectrum indicated that the compound was pure.

The above example was repeated, replacing the methanol with an equal volume of dimethylformamide. A large amount of tars was formed and it was not possible to isolate any 1-methyl-2-pyridiniumaldoxime chloride.

Example 2

A reaction was carried out similar to Example 1, but at 80° C. The methanol was filtered from 26.5 g. of wet crystals. Extraction of an aqueous solution of these crystals with ethyl ether gave 1 g. of unreacted starting material. Crystallization resulted in 19 g. of purified product for a yield of 55%.

Example 3

A preparation was carried out which differed from Example 1, in that double quantities were reacted at 100° C. for 4 hrs. Filtration of the cooled reaction mixture gave 45 g. of wet crystals. The methanol was evaporated from the filtrate, the residue was combined with the crystals which were dissolved in water, treated with activated carbon to remove color and filtered. Sufficient water was evaporated to induce crystallization. The yield of purified product was 48.4 g. (70% of theory).

As will be apparent to those skilled in the art, numerous modifications and variations of the above embodiments may be made without departing from the spirit of the invention or the scope of the following claims.

I claim:

1. A method for the production of 1-methyl-2-pyridiniumoxime chloride which comprises the reaction of 2-pyridinealdoxime with methyl chloride in the presence of methanol as solvent.

2. The method of claim 1 in which 1–3 moles of methyl chloride are present for each mole of 2-pyridinealdoxime.

3. The method of claim 1 in which 0.3–2.0 parts by weight of methanol are present for each part of 2-pyridinealdoxime.

4. The method of claim 1 in which the reaction is carried out at a temperature of 70–140° C.

References Cited by the Examiner
UNITED STATES PATENTS 2,816,113  12/57  Wilson et al. _____ 260—296
2,996,510  8/61   Green _____ 260—296

NICHOLAS S. RIZZO, *Primary Examiner.*